United States Patent
Horning et al.

(10) Patent No.: US 11,020,761 B2
(45) Date of Patent: Jun. 1, 2021

(54) PISTON ROD SLEEVE MOUNTING FOR FLUID SPRAYER PUMP

(71) Applicant: Graco Minnesota Inc., Minneapolis, MN (US)

(72) Inventors: Jeromy D. Horning, Albertville, MN (US); August F. Legatt, Maple Lake, MN (US)

(73) Assignee: Graco Minnesota Inc., Minneapolis, MN (US)

(*) Notice: Subject to any disclaimer, the term of this patent is extended or adjusted under 35 U.S.C. 154(b) by 0 days.

(21) Appl. No.: 16/740,968

(22) Filed: Jan. 13, 2020

(65) Prior Publication Data

US 2020/0224654 A1 Jul. 16, 2020

Related U.S. Application Data

(60) Provisional application No. 62/792,279, filed on Jan. 14, 2019.

(51) Int. Cl.
| | |
|---|---|
| *F16J 1/00* | (2006.01) |
| *B05B 9/04* | (2006.01) |
| *F04B 53/14* | (2006.01) |
| *F04B 39/00* | (2006.01) |

(52) U.S. Cl.
CPC ........ *B05B 9/0413* (2013.01); *F04B 39/0005* (2013.01); *F04B 53/144* (2013.01); *F16J 1/005* (2013.01)

(58) Field of Classification Search
CPC ... F16J 1/005; F15B 15/1447; F04B 39/0005; F04B 53/144; F04B 53/147; B05B 9/0413
See application file for complete search history.

(56) References Cited

U.S. PATENT DOCUMENTS

| | | | |
|---|---|---|---|
| 2,274,927 A | 3/1942 | Lankford | |
| 3,502,028 A | 3/1970 | Cooper | |
| 4,044,655 A * | 8/1977 | Kennicott | F04B 39/0005 92/258 |
| 4,208,953 A * | 6/1980 | Prusic | F04B 39/0005 92/182 |

(Continued)

FOREIGN PATENT DOCUMENTS

| | | |
|---|---|---|
| CN | 1131235 A | 9/1996 |
| CN | 1070581 C | 9/2001 |

(Continued)

OTHER PUBLICATIONS

Extended European Search Report for EP Application No. 20163489.6, dated Apr. 21, 2020, pp. 10.

(Continued)

*Primary Examiner* — Michael Leslie
(74) *Attorney, Agent, or Firm* — Kinney & Lange, P. A.

(57) ABSTRACT

A piston rod includes a piston end that is removably attached to the piston rod body. A sleeve extends around the piston rod body and interfaces with a seal disposed within a pump. A ring extends from the piston end defines at least a portion of a socket formed in the piston end for connecting the piston end and the piston rod body. The ring has a cylindrical ring exterior and the sleeve rests on the cylindrical ring exterior such that the shank, the ring, and the sleeve radially overlap each other.

19 Claims, 11 Drawing Sheets

(56) References Cited

U.S. PATENT DOCUMENTS

| | | | |
|---|---|---|---|
| 4,500,267 A | 2/1985 | Birdwell | |
| 4,541,783 A | 9/1985 | Walling | |
| 4,568,249 A | 2/1986 | Todd | |
| 4,897,996 A | 2/1990 | Hagin et al. | |
| 5,002,468 A | 3/1991 | Murata et al. | |
| 5,067,882 A | 11/1991 | DeVries et al. | |
| 5,211,611 A | 5/1993 | Lammers et al. | |
| 5,346,037 A | 9/1994 | Flaig et al. | |
| 5,513,962 A | 5/1996 | Easton | |
| 5,586,480 A | 12/1996 | Gardner | |
| 5,984,646 A | 11/1999 | Renfro et al. | |
| 6,015,268 A | 1/2000 | Hetherington | |
| 7,373,870 B2 | 5/2008 | Epshteyn | |
| 7,444,923 B2 | 11/2008 | Horning et al. | |
| 8,382,459 B2 | 2/2013 | Schuller et al. | |
| 8,632,316 B2 | 1/2014 | Headley | |
| 8,632,317 B2 | 1/2014 | Headley | |
| 8,696,330 B2 | 4/2014 | Ohligschlaeger et al. | |
| 9,003,950 B2 | 4/2015 | Headley | |
| 9,540,971 B2 | 1/2017 | Bauck et al. | |
| 10,077,771 B2 * | 9/2018 | Davidson | F04B 53/144 |
| 10,337,614 B2 * | 7/2019 | Horning | F04B 53/144 |
| 10,514,030 B2 * | 12/2019 | Horning | F04B 53/147 |
| 2010/0040486 A1 | 2/2010 | Kellar et al. | |
| 2015/0159647 A1 | 6/2015 | Dille et al. | |
| 2016/0186743 A1 | 6/2016 | Thompson et al. | |

FOREIGN PATENT DOCUMENTS

| | | |
|---|---|---|
| CN | 104265620 A | 1/2015 |
| EP | 2725226 A1 | 4/2014 |
| EP | 3364025 A1 | 8/2018 |
| WO | WO9816742 A1 | 4/1998 |
| WO | WO031414 A2 | 6/2000 |
| WO | WO0134981 A1 | 5/2001 |

OTHER PUBLICATIONS

Extended European Search Report for EP Application No. 20151792.7, dated Apr. 28, 2020, pp. 11.

Second Chinese Office Action for CN Application No. 2018101541686, dated Oct. 9, 2019, pp. 36.

First Chinese Office Action for CN Application No. 2018101541686, dated Feb. 27, 2019, pp. 27.

Extended European Search Report for EP Application No. 18157930.1, dated Jun. 29, 2019, pp. 10.

Third Chinese Office Action for CN Application No. 2018101541686, dated Jan. 17, 2020, pp. 9.

* cited by examiner

PISTON ROD SLEEVE MOUNTING FOR FLUID SPRAYER PUMP

CROSS-REFERENCE TO RELATED APPLICATION(S)

This application claims the benefit of U.S. Provisional Application No. 62/792,279 filed Jan. 14, 2019 for "PISTON ROD SLEEVE MOUNTING FOR FLUID SPRAYER PUMP" by J. D. Horning and A. F. Legatt, the disclosure of which is hereby incorporated in its entirety.

BACKGROUND

This disclosure relates generally to piston rods. More particularly, this disclosure relates the removable sleeves for piston rods.

Fluid dispensing systems, such as fluid dispensing systems for paint and other solutions, typically utilize axial displacement pumps to pull a fluid from a source and to drive the fluid downstream. The axial displacement pump includes a piston that is driven in a reciprocatory manner along its longitudinal axis to pump the fluid. As the piston reciprocates, fluid is drawn into the pump and driven downstream. Displacement pumps include dynamic seals to prevent fluid from leaking around the piston. The piston can experience significant wear due to a combination of factors, such as the high pressures produced during pumping; the cyclic relative movement of the interfacing parts, such as the piston and the dynamic seal; and the abrasive nature of the fluid being pumped. Even where the piston is formed from a high-grade hardened steel, the abrasive nature of the pumped fluid and the high pressures can cause excessive wear on the piston. If the piston becomes worn, then the entire piston requires replacement.

SUMMARY

According to one aspect of the disclosure, a piston component of a piston of a paint sprayer in which the piston has a sleeve and a shank, includes a socket for receiving the shank, and a ring projecting from the piston component and defining at least a portion of the socket. The ring has a cylindrical ring exterior, wherein the shank fits within the socket and the sleeve rests on the cylindrical ring exterior such that the shank, the ring, and the sleeve radially overlap each other.

According to another aspect of the disclosure, a piston of a paint sprayer in which the piston is configured to reciprocate on a piston axis, includes a piston rod body having a first cylindrical exterior surface, a piston end having a second cylindrical exterior surface in which the piston end is detachable from and re-attachable to the piston rod body, and a sleeve mountable on the piston rod body, in which the sleeve has an inner cylindrical surface. The inner cylindrical surface rests on and overlaps each of the first cylindrical exterior surface and the second cylindrical exterior surface when the sleeve is mounted on the piston rod body and the piston end is attached to the piston rod body.

According to yet another aspect of the disclosure, a method of assembling a piston includes sliding a sleeve onto a first portion of a piston rod such that an inner circumferential surface of the sleeve contacts and slides over a first centering control portion formed on the first portion of the piston rod; and inserting a shank formed on one of the first portion of the piston rod and a second portion of the piston rod into a socket formed on the other of the first portion of the piston rod and the second portion of the piston rod to secure the first portion of the piston rod to the second portion of the piston rod. The inner circumferential surface of the sleeve slides over and contacts a second centering control portion formed on the second portion of the piston rod. The first centering control portion and the second centering control portion support the sleeve on the piston rod and align the sleeve on a longitudinal axis of the piston rod.

DETAILED DESCRIPTION

Pumps according to the present disclosure reciprocate a piston within a cylinder to pump various fluids, examples of which include paint, water, oil, stains, finishes, aggregate, coatings, and solvents, amongst other options. A piston pump can generate high fluid pumping pressures, such as 3,000-5,000 pounds per square inch (psi) (about 20.7-34.5 megapascal (MPa)) or even higher. High fluid pumping pressure is useful for atomizing the fluid into a spray for applying the fluid to a surface. The generation of high fluid pumping pressure can cause accelerated wear in the components of the pump which reciprocate relative to one another. Aspects of the present disclosure can reduce the effects of wear in a piston pump, as further discussed herein.

Figure 1A:
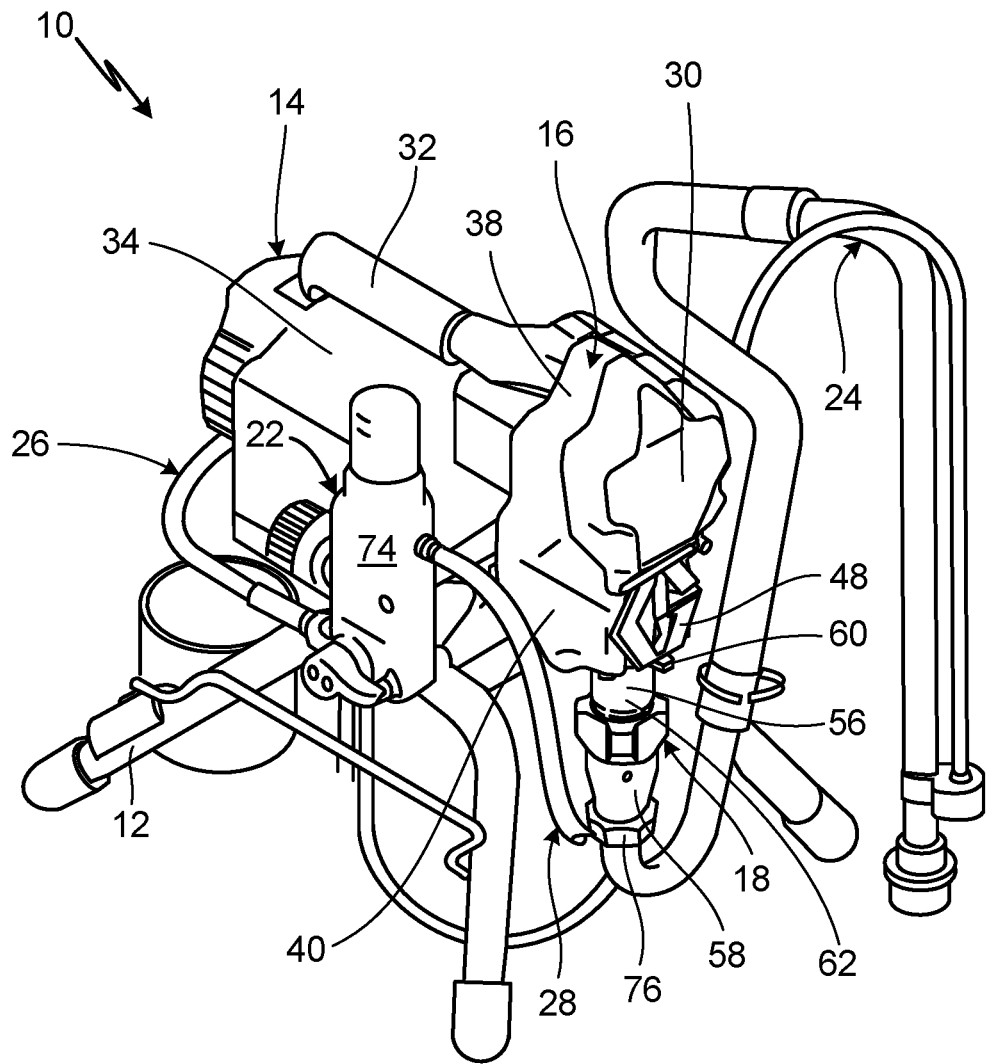
FIG. 1A is an isometric view of a fluid dispensing system.
Figure 1B:
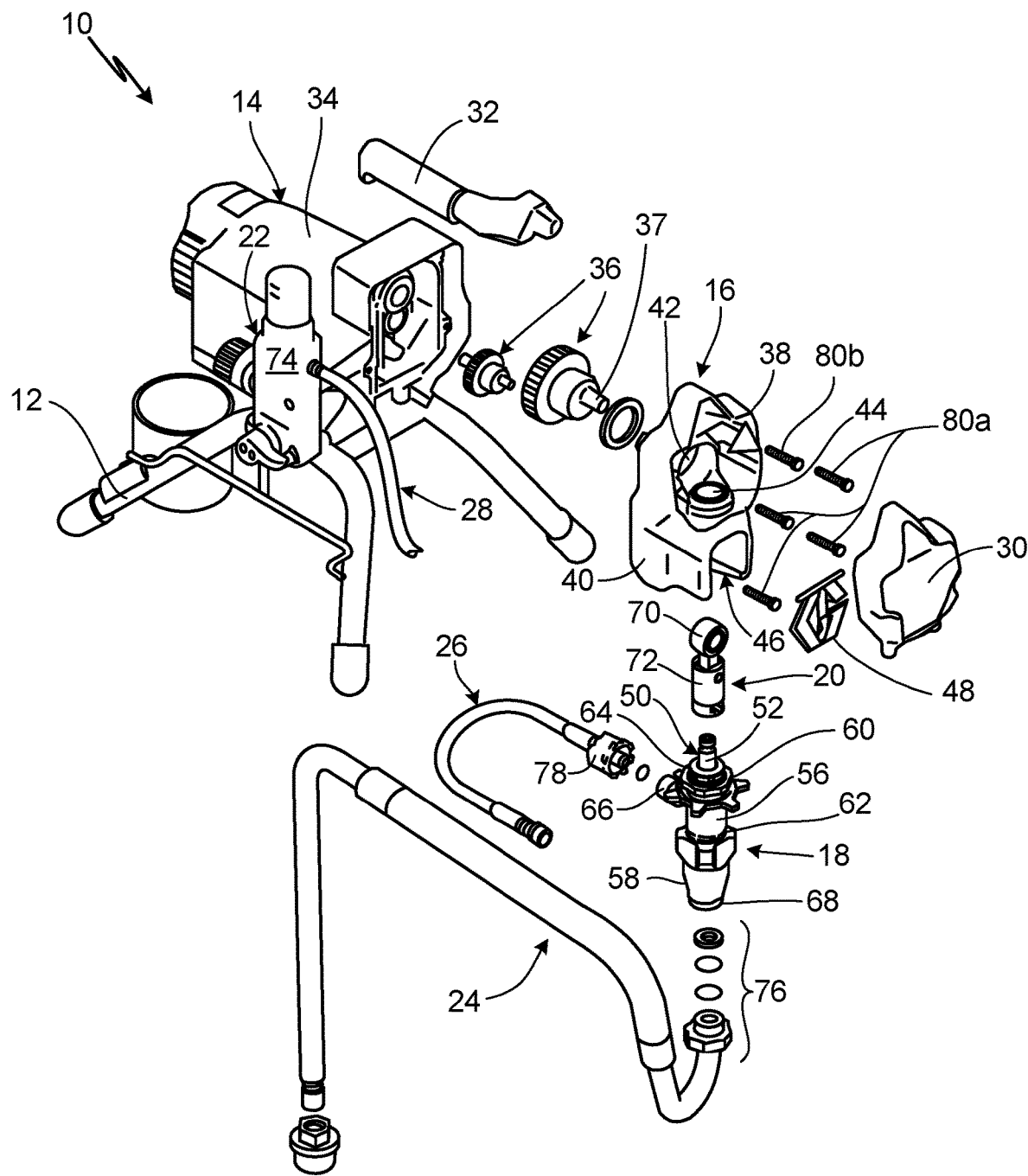
FIG. 1B is an exploded view of the fluid dispensing system shown in FIG. 1A.

FIG. 1A is an isometric view of fluid dispensing system 10. FIG. 1B is an exploded view of fluid dispensing system 10. FIGS. 1A and 1B will be discussed together. Fluid dispensing system 10 includes frame 12, motor section 14, drive housing 16, displacement pump 18, reciprocating drive 20 (FIG. 1B), control system 22, intake hose 24, supply hose 26, dispensing hose 28, housing cover 30, and handle 32. As shown in FIG. 1B, motor section 14 includes motor housing 34 and drive gears 36, and drive gear 36 includes eccentric drive pin 37. Drive housing 16 includes upper portion 38 and lower portion 40. Upper portion 38 includes gear aperture 42 and link aperture 44. Lower portion 40 includes mounting cavity 46 and guard 48. As shown in FIG. 1B, displacement pump 18 includes piston 50 (which includes piston rod 52 and sleeve 54 (shown in FIGS. 2B-6B)), cylinder 56, intake housing 58, and clamp 60. Cylinder 56 includes upstream end 62, downstream end 64, and outlet port 66. Intake housing 58 includes inlet port 68. Reciprocating drive 20 includes connecting rod 70 and drive link 72. Control system 22 includes control housing 74. Intake hose 24 includes intake fitting 76, and supply hose 26 includes supply fitting 78.

Frame 12 supports motor section 14, and drive housing 16 is mounted to motor section 14. Fasteners 80a (FIG. 1B) extend through drive housing 16 and into motor section 14 to secure drive housing 16 to motor section 14. Handle 32 is attached to drive housing 16 by fastener 80b (FIG. 1B), which extends through drive housing 16 and into handle 32. Housing cover 30 is attached to and encloses upper portion 38 of drive housing 16. Drive gears 36 are disposed within motor section 14 and extend into upper portion 38 of drive housing 16 through gear aperture 42. Drive gears 36 are driven by a motor (not shown) disposed within motor housing 34. Eccentric drive pin 37 extends into upper portion 38 and is configured to engage connecting rod 70. Any desired motor can be utilized to power drive gears 36. For example, fluid dispensing system 10 can be electrically, pneumatically, or hydraulically powered.

Upper portion 38 of drive housing 16 can be integral with lower portion 40 of drive housing 16. Gear aperture 42 extends through a rearward side of upper portion 38, and link aperture 44 extends through drive housing 16 between upper portion 38 and lower portion 40. Mounting cavity 46 extends into lower portion 40 and is configured to receive displacement pump 18. Guard 48 is mounted on lower portion 40 and is configured to cover mounting cavity 46.

Reciprocating drive 20 is disposed within drive housing 16. Drive link 72 is attached to connecting rod 70. Connecting rod 70 is disposed within upper portion 38 of drive housing, and drive link 72 extends through link aperture 44 and into mounting cavity 46. Connecting rod 70 is attached to and driven by drive gears 36 extending into upper portion 38 through gear aperture 42. Connecting rod 70 and eccentric drive pin 37 translate the rotational movement of drive gears 36 into linear movement of drive link 72.

Displacement pump 18 is at least partially disposed within mounting cavity 46 and can be secured by clamp 60. Clamp 60 extends about cylinder 56, and clamp 60 secures displacement pump 18 to lower portion 40 of drive housing 16. While displacement pump 18 is described as being secured to drive housing 16 by clamp 60 disposed on cylinder 56, it is understood that displacement pump 18 can be mounted in any suitable manner. For example, displacement pump 18 can include external threads configured to mate with threading on drive housing 16, or displacement pump 18 can be secured by a clamping mechanism integral with drive housing 16.

Intake housing 58 is attached to upstream end 62 of cylinder 56 to form a body of displacement pump 18. Piston 50 is at least partially disposed within the body of displacement pump 18. Piston rod 52 extends into cylinder 56 through downstream end 64 of cylinder 56. An end of piston rod 52 extending out of cylinder 56 is connected to drive link 72, and drive link 72 is configured to drive piston rod 52 in a reciprocating manner. Piston rod 52 can be connected to drive link 72 in any suitable manner; for example, piston rod 52 can include a head mounted in a slot in drive link 72, or piston rod 52 can be pinned to drive link 72.

Intake hose 24 extends between a fluid source and displacement pump 18. Intake fitting 76 is connected to inlet port 68 to provide the fluid to intake housing 58. Supply hose 26 extends between outlet port 66 of cylinder 56 and control housing 74, to provide the fluid from displacement pump 18 to control housing 74. Supply fitting 78 is connected to outlet port 66 to attached supply hose 26 to displacement pump 18. Dispensing hose 28 is connected to control housing 74 and extends between control housing 74 and a dispenser (not shown), such as a spray gun. Control system 22 includes various components, such as a pressure regulator and a priming valve, utilized to set a flow rate and flow pressure, among other operational criteria, of the fluid. Dispensing hose 28 provides the fluid downstream of fluid dispensing system 10.

During operation, the motor of motor section 14 drives drive gears 36 in a rotational manner, and connecting rod 70 follows drive gears 36 due to the connection of eccentric drive pin 37 and connecting rod 70. Connecting rod 70 translates the rotational movement of drive gears 36 into linear movement of drive link 72, such that drive link 72 reciprocates through link aperture 44. Drive link 72 thereby drives piston 50 in a reciprocating manner, due to the connection of piston rod 52 and drive link 72. Driving piston 50 in a reciprocating manner causes piston 50 to draw the fluid into displacement pump 18 through intake hose 24 and intake housing 58, and to pump the fluid downstream through cylinder 56 and supply hose 26.

The fluid is drawn from an external source (e.g., a bucket) through intake hose 24 and enters displacement pump 18 through inlet port 68. The fluid is driven through displacement pump 18 by piston 50, and the fluid exits displacement pump 18 through outlet port 66 in cylinder 56. The fluid flows into supply hose 26 from outlet port 66 and flows to control housing 74. The fluid exits control housing 74 through dispensing hose 28 and flows downstream to the dispenser, where the fluid can be dispensed for any desired purpose, such as applying paint to a surface with a spray gun. Displacement pump 18 thus draws the fluid from a container through intake hose 24, drives the fluid downstream to control system 22 through supply hose 26, and drives the fluid through dispensing hose 28 and to a dispenser where the fluid is applied in any desired manner.

Figure 2A:
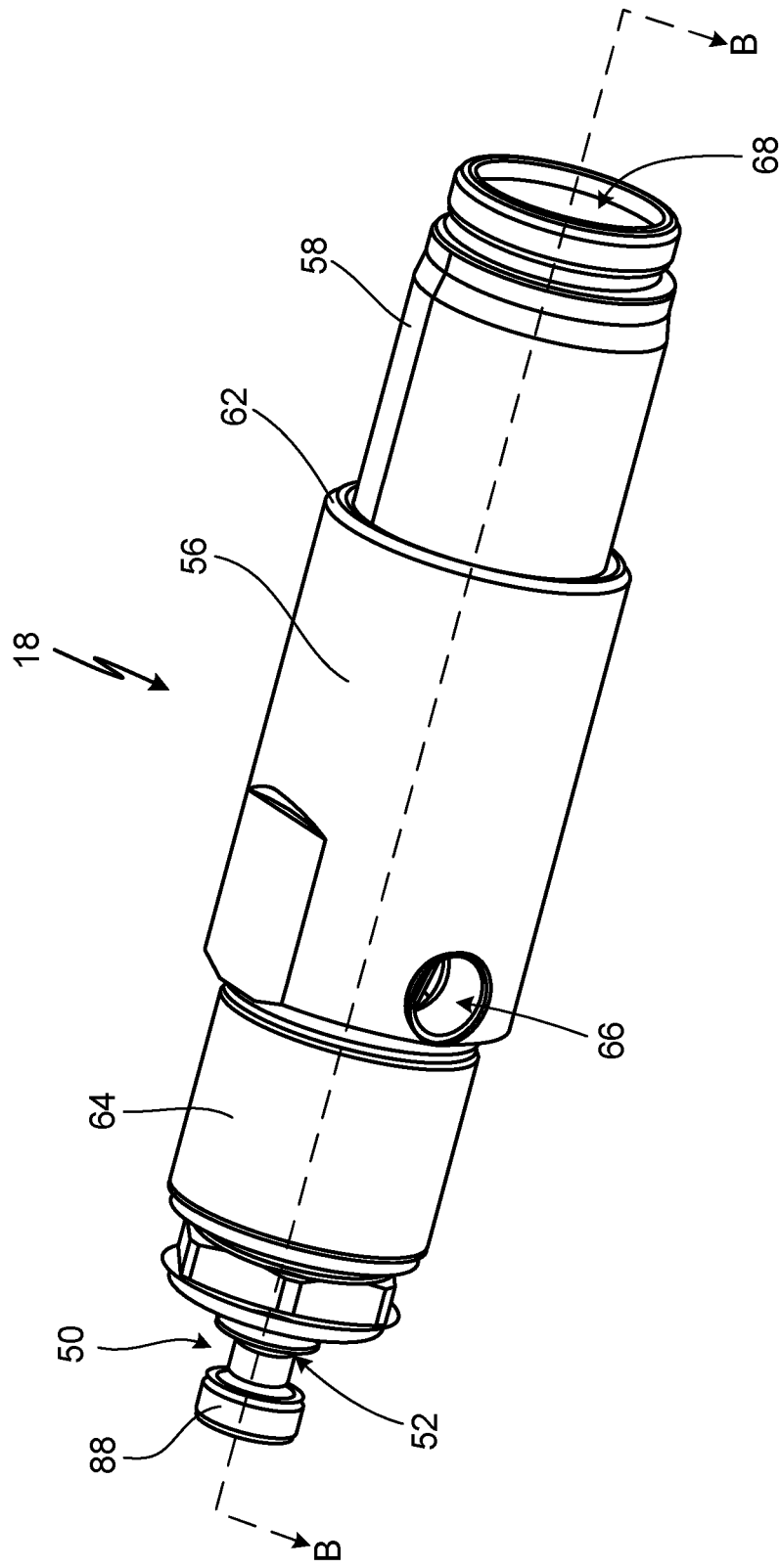
FIG. 2A is an isometric view of a pump.
Figure 2B:
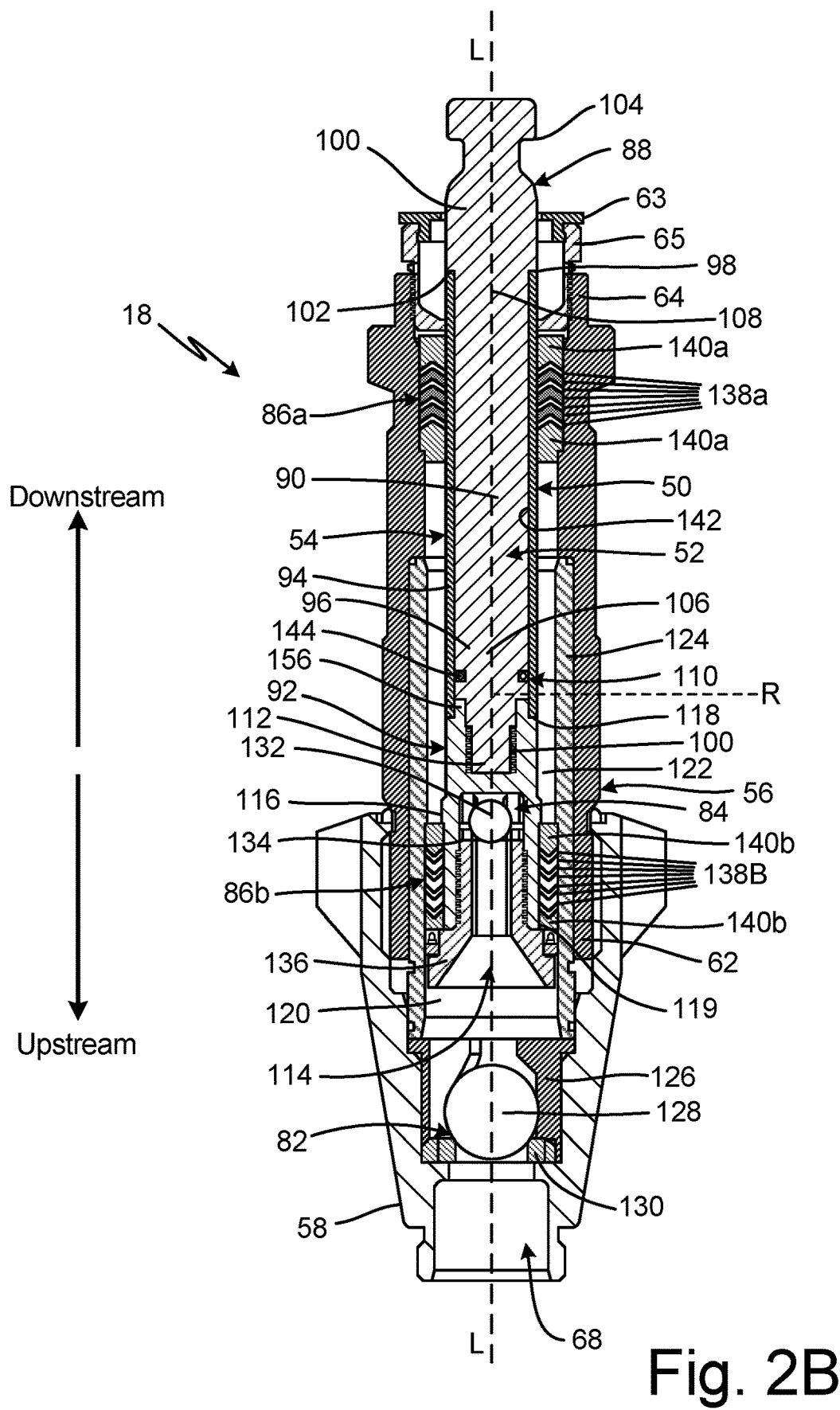
FIG. 2B is a cross-sectional view taken along line B-B in FIG. 2A.

FIG. 2A is an isometric view of displacement pump 18. FIG. 2B is a cross-sectional view of displacement pump 18 taken along line B-B in FIG. 2A. Displacement pump 18 includes piston 50, cylinder 56, intake housing 58, first check valve 82, second check valve 84, and first and second dynamic seals 86a, 86b (collectively herein "dynamic seals 86"). Piston 50 includes piston rod 52 and sleeve 54. Piston rod 52 includes piston cap 88, piston rod body 90, and piston head 92. Sleeve 54 includes sleeve body 94, first end 96, and second end 98. Piston cap 88 includes cap shoulder 102 and connecting portion 104. Piston rod body 90 includes upstream end 106, downstream end 108, seal groove 110, and shank 112. Piston head 92 includes socket 100, central bore 114, flange 116, head shoulder 118, and relief 119.

As shown, the socket 100 receives the shank 112 to connect the piston head 92 to the piston rod body 90. In some examples, shank 112 and socket 100 include interfaced threading to threadedly connect piston head 92 and piston rod body 90. It is understood, however, that socket 100 and shank 112 can interface in any desired manner to secure piston head 92 to piston rod body 90. Piston head 92 also includes a projecting ring 156 which extends in the downstream direction from the rest of the piston head 92.

The piston 50 is coaxial with the longitudinal axis L-L. As such, the piston rod 52, piston cap 88, piston head 92, and sleeve 50 are coaxial with the longitudinal axis L-L. A vector R is shown as extending orthogonal with respect to longitudinal axis L-L. As shown, the vector R extends through each of the shank 112, the projecting ring 156, and the sleeve 50. In this way, the shank 112, the projecting ring 156, and the sleeve 50 radially overlap with respect to longitudinal axis L-L.

Cylinder 56 includes outlet port 66 (shown in FIG. 2A) and inner cylinder portion 124 and at least partially defines first fluid chamber 120 and second fluid chamber 122. Intake housing 58 includes inlet port 68. First check valve 82 includes cage 126, first ball 128, and first seat 130. Second check valve 84 includes second ball 132, second seat 134, and retainer 136. Dynamic seal 86a includes packing rings 138a and seal glands 140a, and dynamic seal 86b includes packing rings 138b and seal glands 140b. A generally downstream direction is indicated by downstream arrow, and a generally upstream direction is indicated by upstream arrow.

Intake housing 58 is mounted to cylinder 56 to form the body of displacement pump 18. Outlet port 66 extends through cylinder 56. Piston 50 is at least partially disposed within cylinder 56. Piston 50 extends along longitudinal axis L-L, with longitudinal axis L-L oriented coaxially with the generally elongate profile of displacement pump 18. Piston rod 52 extends into cylinder 56 through cap 63 and packing nut 65. Piston rod 52 is elongate along longitudinal axis L-L. Piston rod 52 can be formed from any suitably durable material for withstanding the high pressures associated with pumping. For example, piston rod 52 can be machined or cast from steel, brass, aluminum, or any other suitable metal. In some examples, piston rod 52 can be formed from hardened 440C stainless steel. The components of piston rod 52, such as piston cap 88, piston rod body 90, and piston head 92, can be fabricated separately. However, in the illustrated embodiment, the piston cap 88 and the piston rod body 90 are a single metal piece. Piston cap 88 and piston head 92 are disposed at the distal ends of piston rod 52. As such, each of piston cap 88 and piston head 92 can each be referred to as a piston end.

First check valve 82 is mounted in intake housing 58. Ball cage 126 is disposed within intake housing 58, and first ball 128 is disposed within ball cage 126. In some examples, ball cage 126 is molded from a polymer, but it is understood that ball cage 126 can be formed from any suitably durable material for retaining first ball 128 through repetitive oscillation cycles. First seat 130 is disposed between ball cage 126 and inlet port 68 of intake housing 58. Second check valve 84 is disposed within central bore 114 of piston head 92. Retainer 136 engages an interior surface of piston head 92, such as with threading, to secure second seat 134 within piston head 92. In some examples, second seat 134 is integrally formed on the downstream end of retainer 136. Second ball 132 is disposed within piston head 92. Second seat 134 and retainer 136 are fixed relative to piston head 92. First ball 128 and second ball 132 can be formed from stainless steel or any other suitable material for forming a seal with first seat 130 and second seat 134, respectively. First seat 130 and second seat 134 can be formed from a high-strength material, such as tungsten carbide.

Dynamic seal 86a is disposed between cylinder 56 and piston rod 52. Cap 63 and packing nut 65 are attached to downstream end 108 of cylinder 56 and retain dynamic seal 86a within cylinder 56. Dynamic seal 86a can be supported on a shoulder integral with cylinder 56. Packing rings 138a are retained on cylinder 56, such as on the shoulder, such that dynamic seal 86a remains stationary with respect to cylinder 56 as piston 50 reciprocates relative to cylinder 56 during operation. Sleeve 54 is located along the portion of piston rod 52 that overlaps, along longitudinal axis L-L, with packing rings 138a throughout the full extent of the reciprocating movement of piston 50. Packing rings 138a surround and tightly interface with sleeve 54 to create a seal about piston 50, thereby preventing the pumped fluid from leaking out of downstream end 108 of cylinder 56. Packing rings 138a are held between seal glands 140a. Seal glands 140a can be metallic retaining rings, among other options. Packing rings 138a can be formed from leather, polymer, and/or any other suitable sealing material.

Dynamic seal 86b is located on and around relief 119 on piston head 92 and provides a fluid seal between piston head 92 and cylinder 56. Packing rings 138b are mounted on piston head 92 and are retained by seal glands 140b. Flange 116 extends radially from piston head 92 and is disposed at a downstream end of dynamic seal 86b. Flange 116 prevents the downstream seal gland 140b, and thus packing rings 138b, from moving in the downstream direction relative to piston rod 52. Retainer 136 supports the upstream seal gland 140b to prevent seal gland 140b, and thus packing rings 138b, from moving in an upstream direction relative to piston rod 52. Dynamic seal 86b divides cylinder 56 into first fluid chamber 120 and second fluid chamber 122. In the example shown, dynamic seal 86b reciprocates with piston rod 52 relative to cylinder 56. It is understood, however, that dynamic seal 86b can be mounted on cylinder 56 such that dynamic seal 86b remains stationary with respect to cylinder 56 as piston rod 52 reciprocates relative to dynamic seal 86b. Seal glands 140b can be metallic retaining rings, among other options. Packing rings 138b can be formed from leather, polymer, and/or any other suitable sealing material. While displacement pump 18 is illustrated as including two dynamic seals 86a, 86b, it is understood that displacement pump 18 can include any number of dynamic seals 86a, 86b. Moreover, while dynamic seals 86a, 86b are shown as including a stack of packing rings 138, it is understood that dynamic seals 86a, 86b can be of any desired configuration, such as single polymer rings that fit around piston rod 52 within cylinder 56, and that include inner and/or outer projecting ribs that engage and seal with the outer surface of piston rod 52 and/or inner cylinder portion 124 of cylinder 56.

Piston rod body 90 extends between piston cap 88 and piston head 92. Socket 100 extends into piston head 92. Shank 112 extends from upstream end 108 of piston rod body 90. Shank 112 is received in socket 100 to removably connect piston rod body 90 and piston head 92. In some examples, socket 100 includes internal threading and shank 112 includes external threading configured to mate with the internal threading to threadedly connect piston rod body 90 and piston head 92. It is understood, however, that piston rod body 90 and piston head 92 can be connected in any desired manner that allows for piston head 92 to be removed from piston rod body 90. For example, a bore can extend through piston head 92 and shank 112, and a pin can be received in the bore to secure shank 112 within socket 100. Piston cap 88 is unitary with piston rod body 90, such that piston cap 88 and piston rod body 90 are formed from a single part. It is understood, however, that both piston head 92 and piston cap 88 can be removably connected to piston rod body 90 such that piston rod 52 is formed from three separable components which can be attached via threaded connections in the same manner as shank 112 and socket 100. Connecting portion 104 of piston cap 88 is configured to connect to a driving mechanism, such as reciprocating drive 20, to facilitate reciprocating motion of piston 50. Connecting portion 104 can also be referred to as a cap head.

Cap shoulder 102 is a portion of piston cap 88 extending radially relative to piston rod body 90. Head shoulder 118 is a portion of piston head 92 extending radially relative piston rod body 90. Cap shoulder 102 and head shoulder 118 define cylindrical relief 142 extending around piston rod body 90. While the terms head shoulder 118 and cap shoulder 102 are used herein, it is understood that the cap shoulder 102 and head shoulder 118 are not necessarily integral with piston cap 88 and piston head 92, respectively. Cap shoulder 102 and head shoulder 118 can refer to any two shoulders respectively closer to piston cap 88 and piston head 92 for retaining sleeve 54. Any reference to cap shoulder 102 can be replaced with the terms first shoulder and/or downstream shoulder, and any reference to head shoulder 118 can be replaced with the terms second shoulder and/or upstream shoulder.

Sleeve 54 is tubular and is disposed on piston rod body 90. Sleeve 54 is coaxially aligned with piston rod 52, and specifically with piston rod body 90. Sleeve 54 is disposed in cylindrical relief 142 and is secured on piston rod body 90 by head shoulder 118 and cap shoulder 102. First end 96 of sleeve 54 abuts head shoulder 118 and second end 98 of sleeve 54 abuts cap shoulder 102. In the example shown, the inner surface of sleeve 54 contacts the radially outer surface of piston rod body 90 along a full length of sleeve body 94. It is understood, however, that a central portion of piston rod body 90 can have a reduced diameter such that a chamber is formed between the sleeve body 94 and piston rod body 90. In such an example, downstream end 108 and upstream end 106 of piston rod body 90 are sized to maintain contact with sleeve body 94, while the chamber extends between upstream end 106 and downstream end 108. With sleeve 54 mounted on piston rod 52, piston 50 has a uniform outer diameter along longitudinal axis L-L between piston cap 88, sleeve 54, and piston head 92.

Sleeve 54 can be formed from a different material than piston rod 52. For example, sleeve 54 can be formed from metal or ceramic, among other options. Sleeve 54 can also be hardened prior to use. In some examples, sleeve 54 is formed from any one or more of yttria stabilized zirconia, aluminum oxide, tungsten carbide, and silicon nitride, among other options. Sleeve 54 can thus be formed from a material that is harder than the metal of piston rod 52 such that sleeve 54 is better able to withstand the abrasive forces experienced during pumping. With sleeve 54 being the only component of piston 50 in contact with dynamic seal 86a, piston rod 52 can be formed from a softer metal and/or can undergo less hardening than that normally required to withstand the abrasion caused during pumping.

Sleeve 54 is removable from piston rod 52. Piston head 92 is detached from piston rod body 90 by rotating piston head 92 to unscrew shank 112 from socket 100. With piston head 92 removed, sleeve 54 can be pulled off of piston rod body 90. Sleeve 54 is installed on piston rod 52 by sliding sleeve 54 onto piston rod body 90 and screwing piston head 92 onto piston rod body 90. As such, sleeve 54 can be quickly and efficiently replaced to provide a new wear surface for piston 50. In embodiments where the piston cap 88 is removable from the piston rod body 90 via a shank, similar to shank 112, and socket, similar to socket 100, interface between the piston cap 88 and the piston rod body 90 (with the piston cap 88 having the shank and the piston rod body 90 having the socket, or the piston cap 88 having the socket and the piston rod body 90 having the shank), the sleeve 54 can be replaced by unscrewing the piston cap 88 from the piston rod body 90 to detach the piston cap 88, sliding the sleeve 54 off of the piston rod body 90, sliding a new sleeve 54 onto the piston rod body 90, and then recoupling the piston cap 88 to the piston rod body 90 by threading the shank into the socket.

Seal groove 110 extends into upstream end 106 of piston rod body 90 proximate piston head 92. Seal groove 110 receives seal 144, which is disposed between piston rod body 90 and sleeve 54. Seal 144 prevents the pumped fluid from migrating into the space between piston rod body 90 and sleeve body 94. In some examples, seal 144 is an o-ring, such as an elastomer o-ring. It is understood, however, that seal 144 can be of any suitable configuration for preventing the pumped fluid from migrating between piston rod body 90 and sleeve body 94. For example, seal 144 can be a gasket disposed on head shoulder 118 and captured between head shoulder 118 and first end 96 of sleeve 54. Moreover, while seal 144 is described as disposed within seal groove 110, it is understood that seal 144 can be retained in any desired manner. For example, seal 144 can be disposed on head shoulder 118, and first end 96 of sleeve 54 can include a chamfer to accommodate seal 144 and maintain seal on head shoulder 118. In other examples, sleeve 54 can include a groove extending into sleeve body 94 for receiving seal 144.

During operation, piston 50 is driven through an upstroke and a downstroke along longitudinal axis L-L by a driving mechanism, such as reciprocating drive 20 (FIG. 1B), to draw fluid into and drive fluid downstream from displacement pump 18. During the upstroke, piston 50 is drawn in the downstream direction, indicated by downstream arrow in FIG. 2B, along longitudinal axis L-L. As piston 50 moves in the downstream direction, the volume of first fluid chamber 120 increases and the volume of second fluid chamber 122 decreases, due to piston head 92 and dynamic seal 86b shifting in the downstream direction. The expanding first fluid chamber 120 experiences a vacuum condition that causes first ball 128 to shift to an open position, where first ball 128 is disengaged from first seat 130. A flowpath is thus opened through first check valve 82, and fluid is drawn into first fluid chamber 120 through inlet port 68 and first check valve 82. During the upstroke, second ball 132 is forced onto second seat 134 and forms a seal with second seat 134 to prevent fluid within second fluid chamber 122 from flowing upstream into first fluid chamber 120. As the volume of second fluid chamber 122 decreases, the fluid within second fluid chamber 122 is driven downstream through outlet port 66 in cylinder 56.

After completing the upstroke, piston 50 reverses course and is driven through the downstroke. During the downstroke, piston 50 is driven in the upstream direction, indicated by the upstream arrow in FIG. 2B. During the downstroke, the volume of first fluid chamber 120 decreases and the volume of second fluid chamber 122 increases. As piston 50 changes over from the upstroke to the downstroke second ball 132 disengages from second seat 134, providing a flowpath through piston head 92 between first fluid chamber 120 and second fluid chamber 122. First ball 128 engages first seat 130, closing first check valve 82 and preventing fluid from backflowing from first fluid chamber 120 through inlet port 68. As piston 50 moves through the downstroke, the fluid within first fluid chamber 120 flows downstream to second fluid chamber 122 through retainer 136, piston head 92, second check valve 84, and piston port 146 (shown in FIGS. 3A-4B and 5B-6B). Outlet port 66 is in unobstructed fluid communication with second fluid chamber 122, and as will be appreciated, fluid is driven downstream through outlet port 66 during both the upstroke and the downstroke of piston 50.

During both the upstroke and the downstroke dynamic seals 86 prevent fluid and air from flowing between the inner surface of cylinder 56 and the outer surface of piston 50. Both dynamic seals 86 are tightly toleranced to build the vacuum condition in first fluid chamber 120 and second fluid chamber 122, and to apply positive pressure during the reciprocation cycle of piston 50. Sleeve 54 is the only portion of piston 50 that contacts dynamic seal 86a during reciprocation of piston 50. As such, sleeve 54 prevents any portion of dynamic seal 86a from contacting any portion of piston rod 52, including piston cap 88, piston rod body 90, and piston head 92. Sleeve 54 thus protects piston rod 52 from experiencing wear caused by relative movement at the interface of piston 50 and dynamic seal 86a.

Sleeve 54 provides significant advantages. Sleeve 54 experiences all of the abrasive forces caused by reciprocating movement of piston 50 relative to dynamic seal 86a. With sleeve 54 being the only portion of piston 50 experiencing wear generated by dynamic seal 86a during reciprocation, piston rod 52 can be formed from a softer metal and/or can undergo less hardening, thereby reducing manufacturing time and costs. Moreover, sleeve 54 can easily be removed and replaced on piston rod 52 by unscrewing piston head 92 from piston rod body 90, pulling sleeve 54 off of piston rod body 90, and replacing a new sleeve 54 on piston rod body 90. Sleeve 54 being removable saves costs and decreases downtime that would previously be required to replace a worn piston 50. In particularly abrasive environments, sleeve 54 can be made of a suitably sturdy, yet cheap, material to facilitate multiple replacements throughout the pumping process while utilizing a single piston 50.

Figure 3:
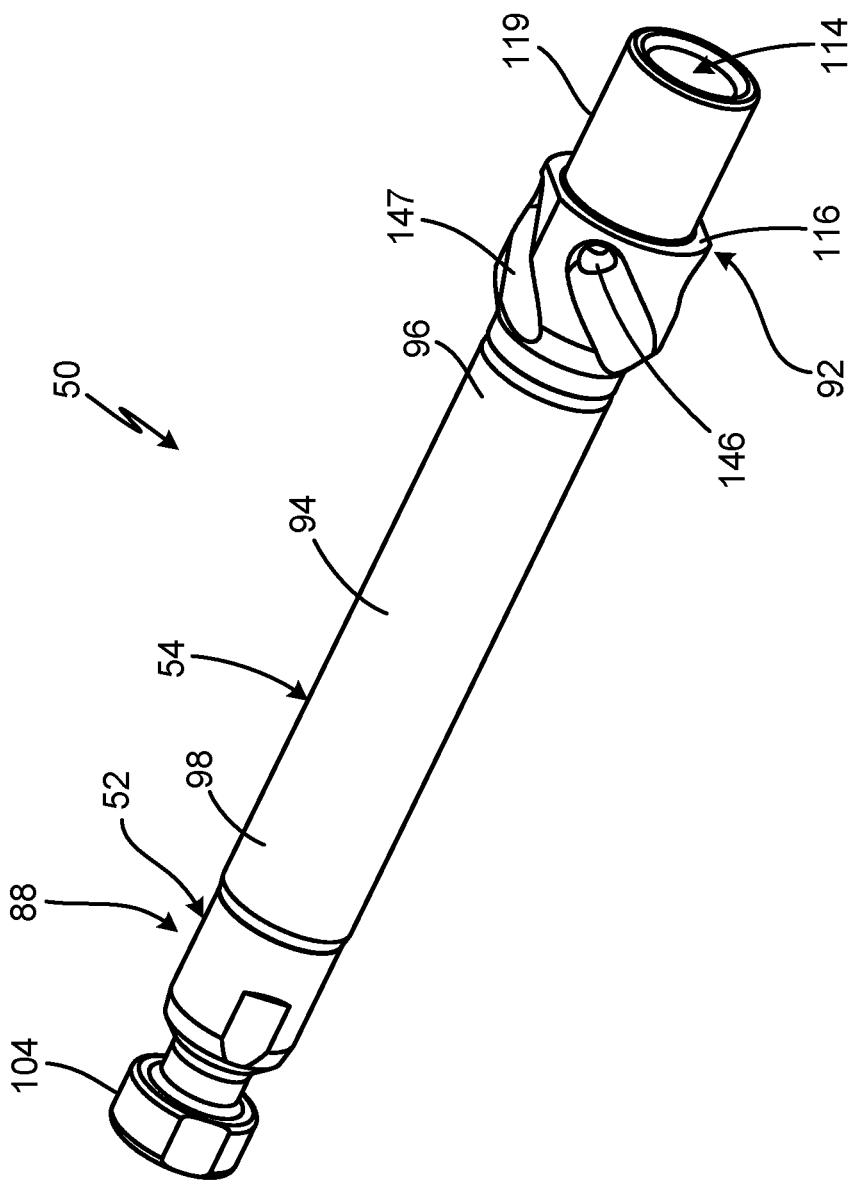
FIG. 3 is an isometric view of a piston rod assembly.

FIG. 3 is an isometric view of piston 50. In this view, the dynamic seal 86b (FIG. 2B) has been removed from relief 119. Piston 50 includes piston rod 52 and sleeve 54. Piston rod 52 includes piston cap 88, piston rod body 90, and piston head 92. Connecting portion 104 of piston cap 88 is shown. Central bore 114, flange 116, relief 119, and piston ports 146 of piston head 92 are shown. Sleeve body 94, first end 96, and second end 98 of sleeve 54 are shown.

Piston ports 146 are arrayed about piston head 92. Grooves 147 extend from piston ports 146 and are arrayed about piston head 92 such that an axis along grooves 147 has both axial and radial components relative to piston axis L-L. Paint being pumped enters the piston head 92 though the central bore 114, passes past the second check valve 84 (FIG. 2B), then exits the piston head 92 through the piston ports 146 into the second fluid chamber 122 (FIG. 2B). Each piston port 146 extends through piston head 92 and provides a flowpath for fluid to flow downstream out of piston head 92. Flange 116 extends radially from piston head 92 and is configured to support a seal, such as dynamic seal 86b, mounted around relief 119.

Figure 4A:
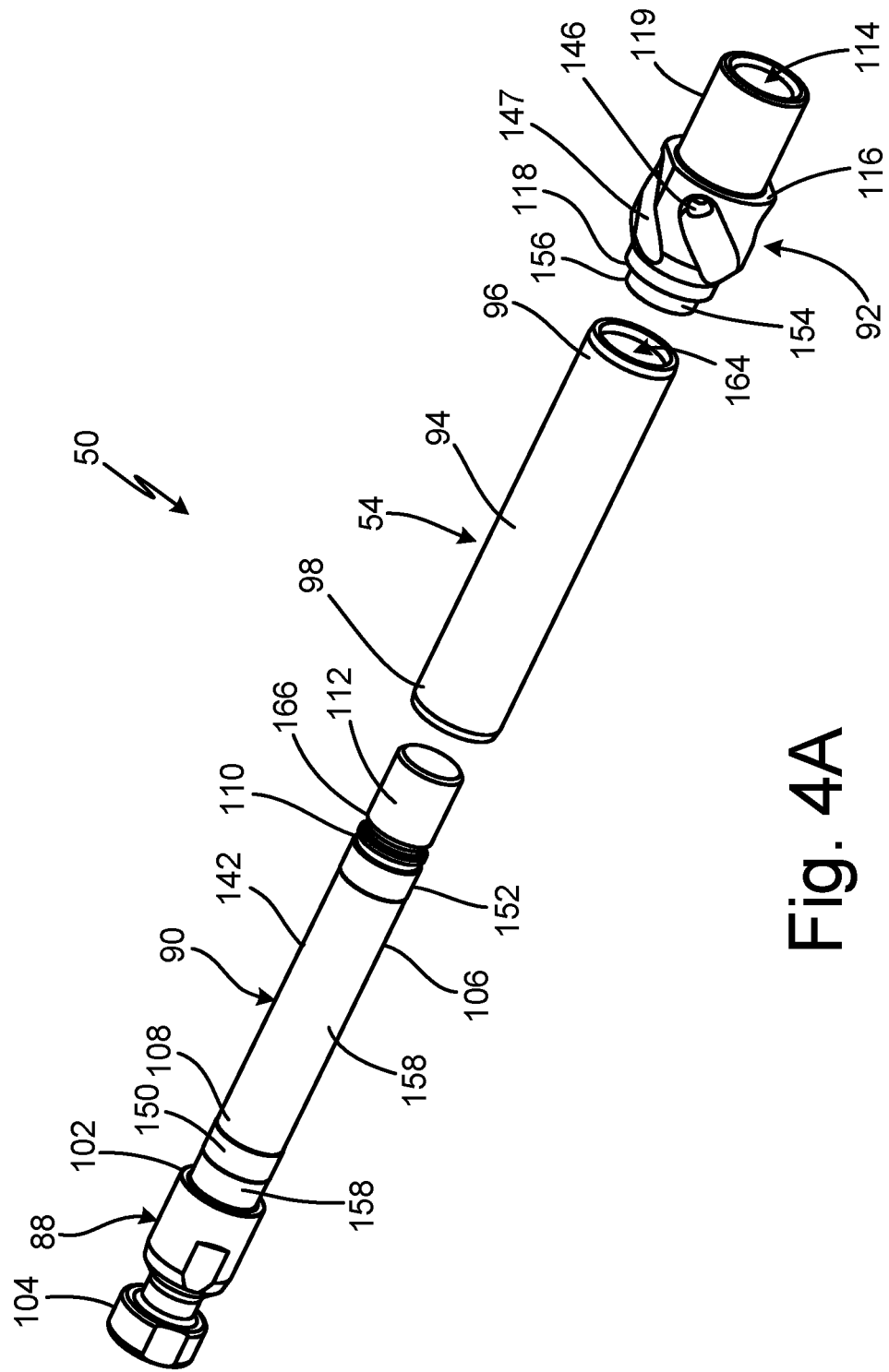
FIG. 4A is a first exploded view of the piston rod assembly.
Figure 4B:
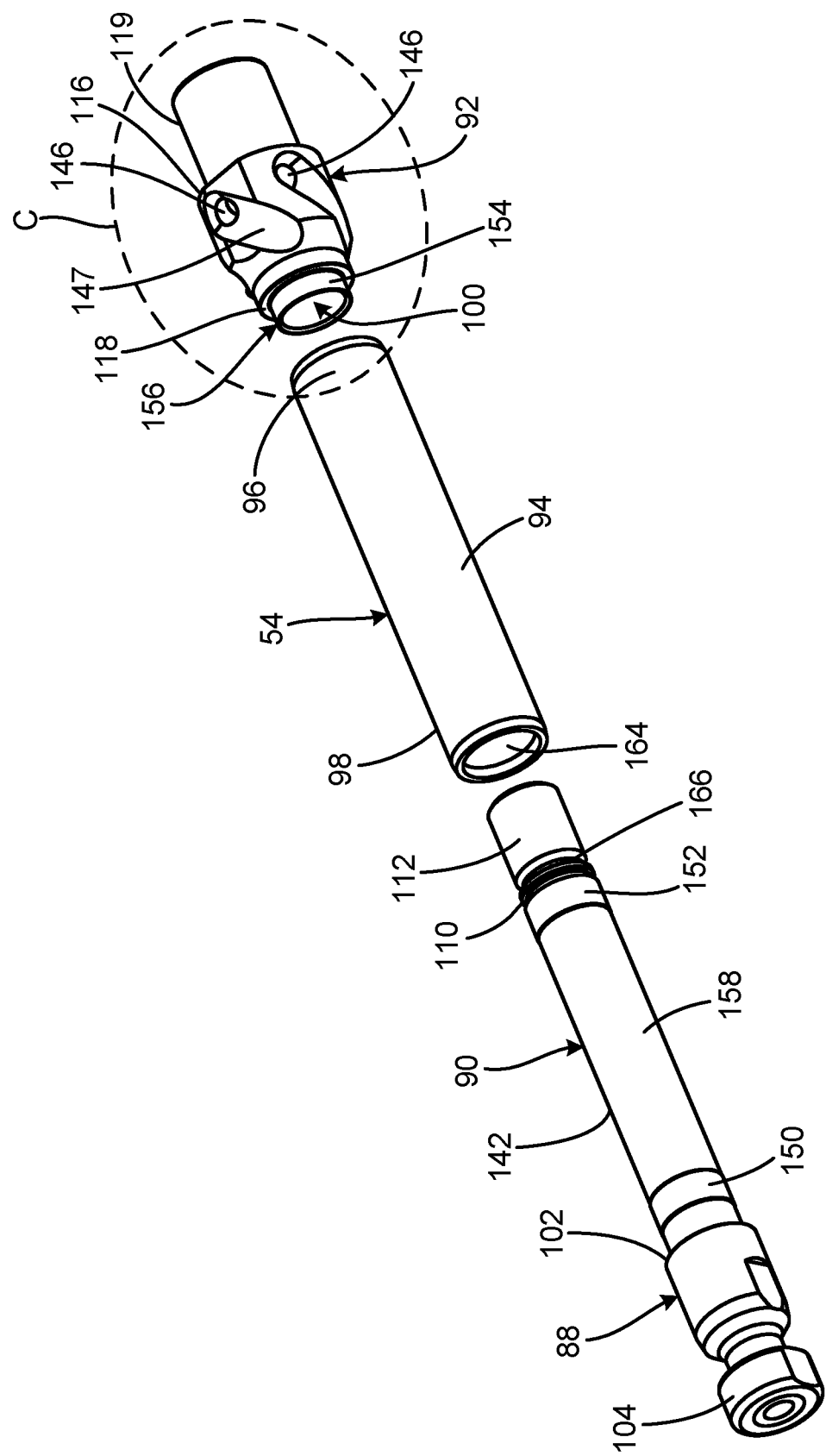
FIG. 4B is a second exploded view of the piston rod assembly.
Figure 4C:
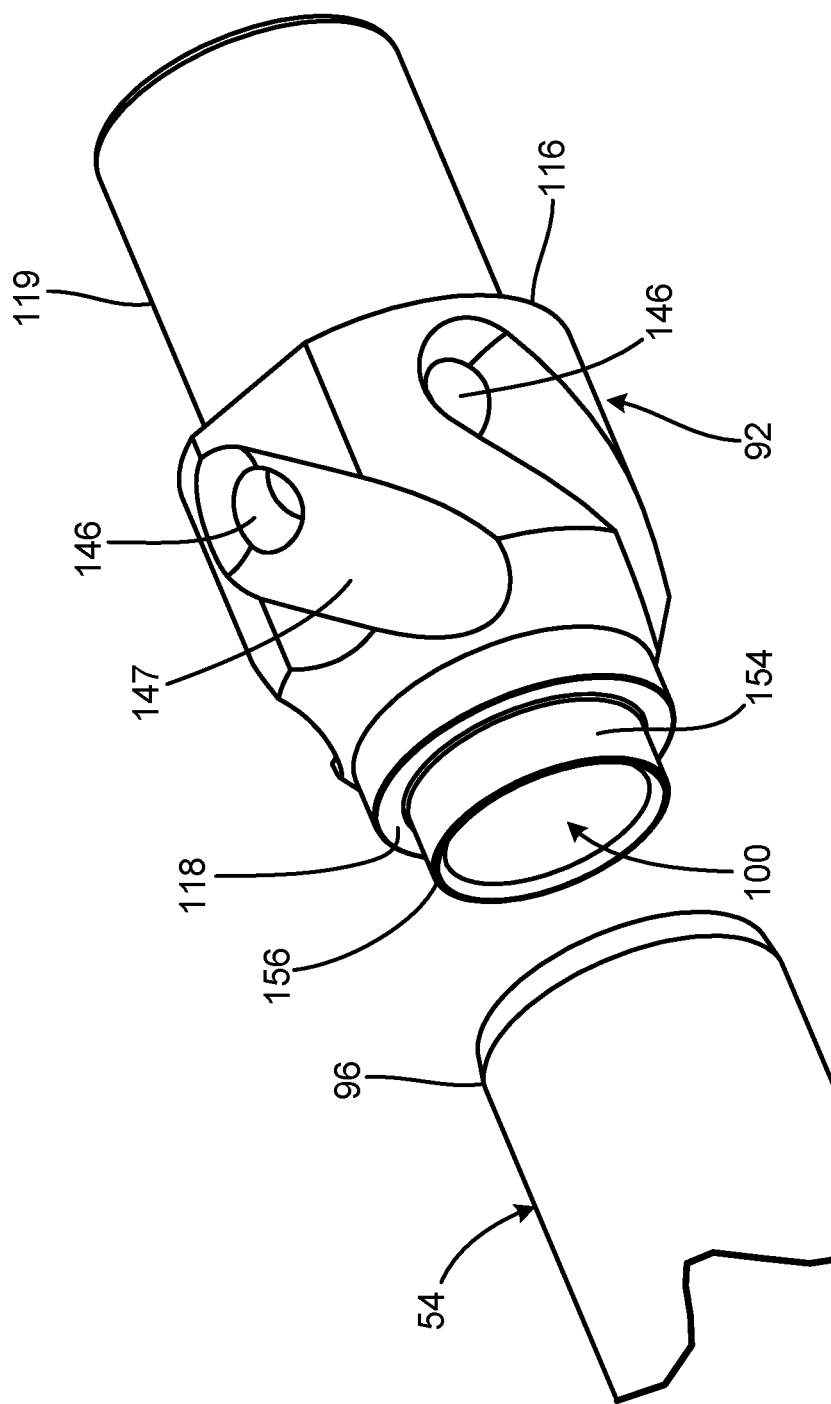
FIG. 4C is an enlarged detail view of detail C in FIG. 4B.

FIG. 4A is a first exploded perspective view of the piston 50. FIG. 4B is a second exploded perspective view of the piston 50 taken from another orientation relative to the view of FIG. 4A. FIG. 4C is an enlarged view of detail C in FIG. 4B. FIGS. 4A-4C will be discussed together. In FIGS. 4A and 4B, dynamic seal 86b (FIG. 2B) has been removed from the relief 119 while the second check valve 84 (FIG. 2B) and seal 144 (FIG. 2B) are not shown. Instead, the view of FIGS. 4A and 4B focuses on the three main hard components of piston 50—the piston rod body 90, the sleeve 54, and the piston head 92.

Piston 50 includes piston rod 52 and sleeve 54. Piston rod 52 includes piston cap 88, piston rod body 90, and piston head 92. Sleeve 54 includes sleeve body 94, first end 96, second end 98, and inner cylindrical portion 164. Piston cap 88 includes cap shoulder 102 and connecting portion 104. Piston rod body 90 includes upstream end 106, downstream end 108, seal groove 110, shank 112, cylindrical relief 142, second centering control section 150, third centering control section 152, non-controlled portions 158, and recess 166. Piston head 92 includes socket 100, central bore 114, flange 116, head shoulder 118, relief 119, piston ports 146, grooves 147, first centering control section 154, and projecting ring 156.

Shank 112 extends from downstream end 108 of piston rod body 90 and is configured to engage socket 100. Projecting ring 156 extends axially downstream from head shoulder 118 and at least partially defines socket 100. Shank 112 is secured within socket 100 to attach piston rod body 90 to piston head 92. In some examples, shank 112 includes external threading configured to mate with internal threading in socket 100. In some examples, the exterior threading is at least partially formed on the interior of projecting ring 156. In other examples, a bore extends through shank 112 and socket 100 and the bore is configured to receive a pin to secure shank 112 within socket 100, thereby connecting piston head 92 and piston rod body 90.

Cap shoulder 102 and head shoulder 118 define cylindrical relief 142 about piston rod body 90. Cylindrical relief 142 extends axially along the length of piston rod body 90 between piston cap 88 and piston head 92. Sleeve 54 is disposed on piston rod body 90 in cylindrical relief 142 and extends between piston cap 88 and piston head 92. Sleeve body 94 is cylindrical and receives piston rod body 90. With sleeve 54 disposed on piston rod body 90, first end 96 of sleeve 54 abuts head shoulder 118 and second end 98 of sleeve 54 abuts cap shoulder 102.

Sleeve 54 is secured on piston rod body 90 by head shoulder 118 and cap shoulder 102. Sleeve 54 covers piston rod body 90 such that piston rod body 90 is prevented from contacting abrasive wear surfaces, such as dynamic seal 86a (shown in FIG. 2B) during operation. Sleeve 54 is a replaceable wear component of piston 50 that increases the lifespan of piston rod 52 by preventing direct contact between piston rod 52 and dynamic seal 86a. With sleeve 54 mounted on piston rod 52, piston 50 can have a uniform outer diameter between piston cap 88, sleeve 54, and piston head 92. As discussed above, sleeve 54 can be made from any desired material, such as metal or ceramic. Sleeve 54 can be mechanically secured on piston rod 52. No adhesive is utilized to secure sleeve 54 on piston rod 52. Mechanically securing sleeve 54 on piston rod 52 facilitates removal and replacement of sleeve 54. The clamping force exerted on sleeve 54 by head shoulder 118 and cap shoulder 102 mechanically secures sleeve 54 on piston rod 52.

Ring 156 extends in the downstream direction from piston head 92. Ring 156 projects in the downstream direction such that ring 156 forms the downstream-most portion of piston head 92. Ring 156 includes first centering control section 154. The first centering control section 154 defines at least part of the cylindrical exterior of ring 156. In some embodiments, the first centering control section 154 can define the entirety of the cylindrical exterior of ring 156. First centering control section 154 is configured to engage inner cylindrical portion 164 of sleeve 54 with sleeve 54 mounted in cylindrical relief 142. As discussed in more detail below, first centering control section 154 aligns sleeve 54 and provides concentricity during mounting.

As shown, ring 156 is adjacent head shoulder 118 and extends further downstream than head shoulder 118. Ring 156 has a smaller outer diameter, relative axis L-L, than the outer diameter of head shoulder 118. Ring 156 is orientated coaxial with shoulder 118 along the axis L-L of piston 50. The inner surface of ring 156 is cylindrical and can be threaded. Ring 156 defines the opening of the socket 100 for receiving the shank 112. In some examples, ring 156 can extend about 0.20 inches (in.) (about 0.50 centimeters (cm)) from head shoulder 118. Ring 156 can be about 0.25 in. (about 0.64 cm) in length along the longitudinal axis L-L of piston 50. Ring 156 can be less than about 0.50 in. (about 1.27 cm) in length along the longitudinal axis L-L of piston

50. In some examples, ring 156 can be between about 0.20-0.50 in. (about 0.50-1.27 cm), inclusive.

Piston rod body 90 includes second centering control section 150 and third centering control section 152. Second and third centering control sections 150, 152 are arrayed along cylindrical relief 142 and project radially from piston rod body 90. Between second and third centering control sections 150, 152 is non-centering section 158, which has a reduced diameter relative to second and third centering control sections 150, 152. Third centering control section 152 can also provide a downstream support for seal 144. As such, second and third centering control sections 150, 152 have larger diameters than non-centering sections 158. Second and third centering control sections 150, 152 can provide the widest diameter portions of piston rod body 90.

Sleeve 54 includes inner cylindrical portion 164 along an interior surface of sleeve 54. Inner cylindrical portion 164 can extend the full length of sleeve 54, or may extend for only a portion of the length of sleeve 50. As further discussed herein, the inner diameter of inner cylindrical portion 164 of sleeve 54 is the same as or slightly larger than the outer diameter of first centering control section 154. The inner diameter of inner cylindrical portion 164 and the outer diameter of first centering control section 154 are sized relative each other such that sleeve 50 can move over first centering control section 154 but with a close and tight fit. For example, the diameter of the first centering control section 154 can be about 0.001-0.005 in. (about 0.025-0.127 millimeters (mm)) smaller than the inner diameter of inner cylindrical portion 164, but it is understood that other larger and smaller dimensional differences are possible. When piston 50 is assembled, first end 96 of sleeve 54 fits over ring 156 and butts against head shoulder 118. In this way, head shoulder 118 can be a radially extending annular ledge on which an end of sleeve 54 can rest. Ring 156 can be a cylindrical ledge extending axially downstream from piston head 92 and on which an end of sleeve 54 can rest. Likewise, first centering control section 154 can form a cylindrical surface of the ledge formed by ring 156 extending downstream relative to head shoulder 118 and on which an interior surface at an end of sleeve 54 can rest. The ledge formed by ring 156 can extend orthogonal with respect to the ledge formed by head shoulder 118. As such, the first end 96 of sleeve 54 can interface with each of head shoulder 118 and first centering control section 154 on ring 156.

The centering control sections 150, 152, 154 are arrayed along cylindrical relief 142. The centering control sections 150, 152, 154 are each disposed underneath sleeve 54 when the piston 50 is assembled. Between the centering control sections 150, 152, 154 are non-centering sections, such as non-centering section 158. The centering control sections 150, 152, 154 and the non-centering sections 158 are all cylindrical; however, the outer diameter of the non-centering sections 158 is slightly less than the outer diameters of the centering control sections 150, 152, 154. Each one of the centering control sections 150, 152, 154 can have the same diameter while the non-centering sections, including the non-centering section 158, can be smaller in diameter relative to the centering control sections 150, 152, 154. The non-centering sections being smaller in diameter than the centering control sections 150, 152, 154 results in the sleeve 54 engaging and resting on each of the centering control sections 150, 152, 154 (e.g., via circumferential contact between an outer cylindrical surface formed by the centering control sections 150, 152, 154 and inner cylindrical surface 164 of sleeve 54). In this way, sleeve 54 may not contact or rest on the non-centering sections, including the non-centering section 158.

To support the span of the sleeve 54, two of the centering control sections 150, 152, 154 are located at upstream and downstream ends of the relief 142. In the example shown, first centering control section 154 is located at the upstream end and second centering control section 150 is located at the downstream end. In some examples, piston rod 52 may not include a centering control section disposed between the upstream and downstream centering control sections. For example, some embodiments of piston rod 50 include only first centering control section 154 and second centering control section 150.

Use of centering control sections 150, 152, 154 can lower manufacturing cost by machining to a higher degree of concentricity along the centering control sections 150, 152, 154 while machining to a lower degree of concentricity along the non-centering sections 158. As shown, along the length of relief 142, the greater amount of the external cylindrical surface area of relief 142 is formed by the non-centering sections 158 than the centering control sections 150, 152, 154. For example, the non-centering sections 158 can form over double the surface area of relief 142 as the centering control sections 150, 152, 154. On just the piston rod body 90, the non-centering sections 158 can form a greater amount of the cylindrical outer surface area underneath sleeve 54 than the centering control sections 150, 152 formed on piston rod body 90. For example, the non-centering sections 158 on the piston rod body 90 can form over double the surface area as compared to the centering control sections 150, 152 on the piston rod body 90.

Inner cylindrical portion 164 of sleeve is configured to interface with centering control sections 150, 152, 154 with piston 50 assembled. In some examples, inner cylindrical portion 164 extends a full length of sleeve 54. In other examples, inner cylindrical portion 164 extends for only a portion of the length of sleeve 54 and/or multiple ones of inner cylindrical portions 164 are formed along the length of sleeve 54 to interface with the multiple ones of centering control sections 150, 152, 154. The inner diameter of inner cylindrical portion 164 is the same as or slightly larger than the outer diameters of centering control sections 150, 152, 154 such that sleeve 54 can slide over centering control sections 150, 152, 154 with a close and tight fit. Centering control sections 150, 152, 154 engage inner cylindrical portion 164 to support sleeve 54 on piston rod 52 with piston 50 assembled. As such, sleeve 54 can interface with and be supported by surfaces of piston rod 52 forming less than the full axial length of cylindrical relief 142.

Piston 50 provides significant advantages. Sleeve 54 is mounted on piston rod 52 and protects piston rod 52 from experiencing wear due to moving relative to dynamic seal 86a. With sleeve 54 experiencing all wear caused by dynamic seal 86a, piston rod 52 can be manufactured from a softer metal and/or can undergo less hardening, thereby saving manufacturing costs. In addition, sleeve 54 is replaceable, thereby extending the useful life of piston rod 52 by allowing the user to replace sleeve 54 and continue using the same piston rod 52, which saves replacement costs. Sleeve 54 is retained on piston rod body 90 by head shoulder 118 and cap shoulder 102 without the use of adhesives, which facilitates quick and efficient removal and replacement of sleeve 54. Use of centering control sections 150, 152, 154 can lower manufacturing cost by machining to a higher degree of concentricity along the centering control sections 150, 152, 154 while machining to a lower degree of concentricity along the non-centering sections 158. Centering control sections 150, 152, 154 interface with inner cylindrical portion 164 of sleeve 54 to hold sleeve 54 in alignment on piston rod 52. Maintaining concentricity prevents undesired wear on sleeve 54 and dynamic seal 86a as piston 50 reciprocates during operation. Piston head 92 is removable from piston rod body 90, which allows the user to quickly and efficiently replace individual parts forming piston rod 52 and to replace sleeve 54, which prevents the user from having to replace the full piston 50, thereby saving costs and materials.

Figure 5A:
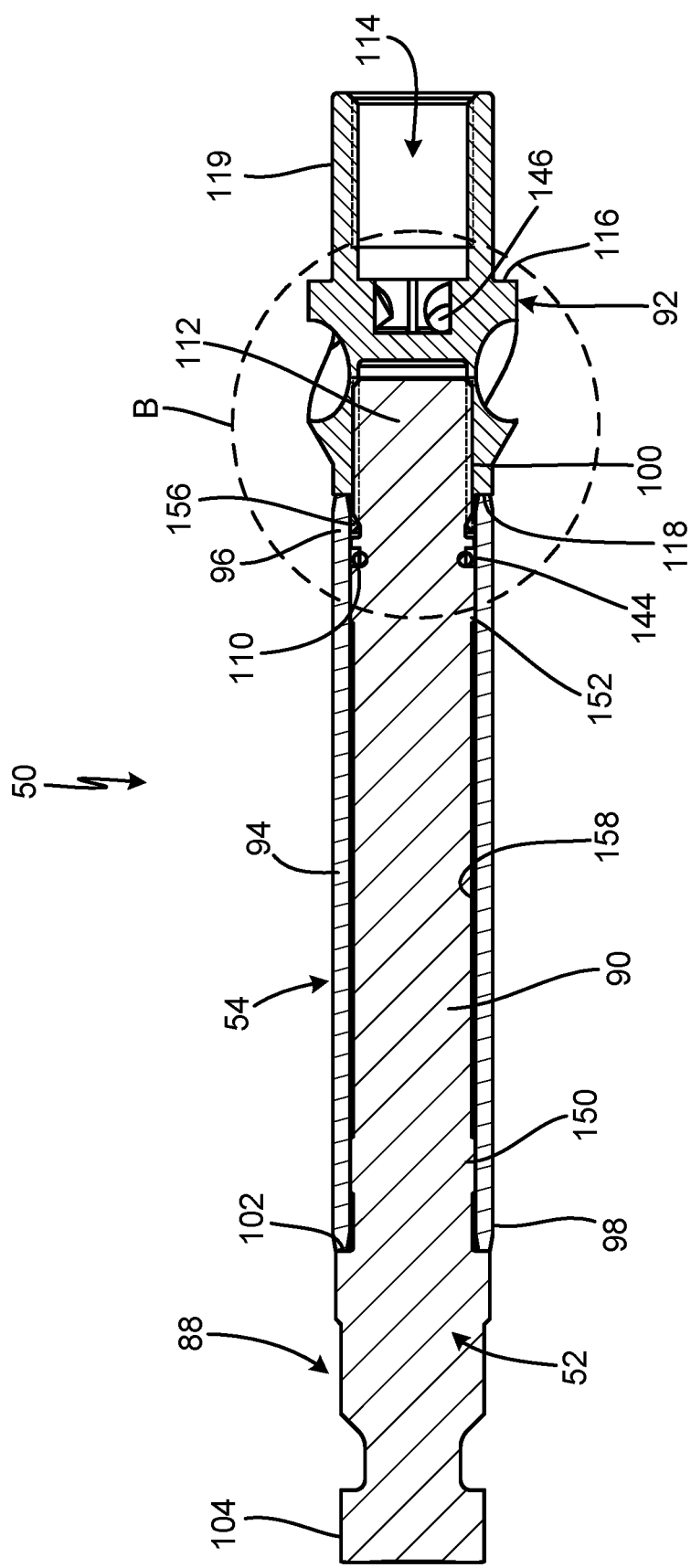
FIG. 5A is a cross-sectional view of a piston.
Figure 5B:
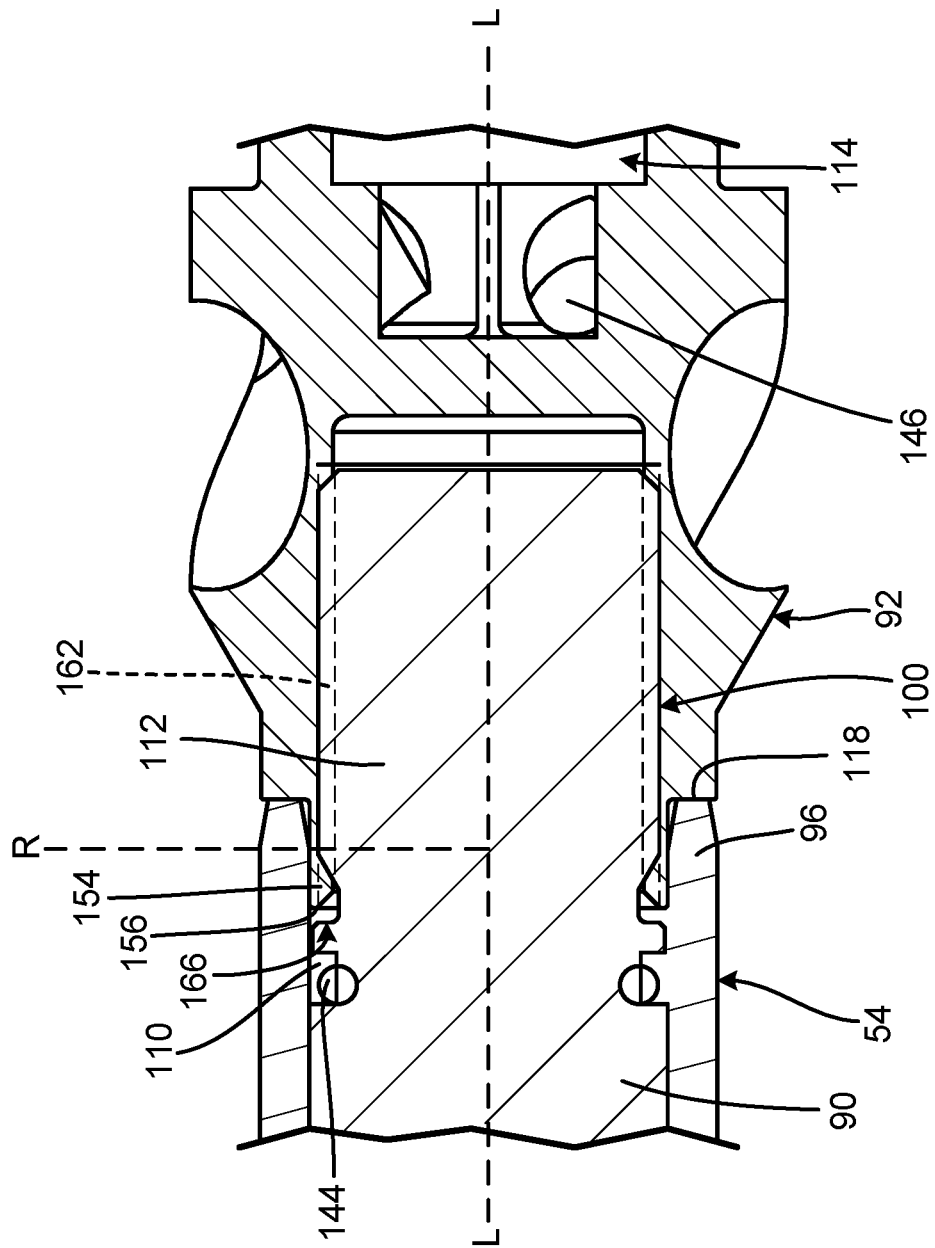
FIG. 5B is an enlarged detail view of detail B in FIG. 5A.

FIG. 5A is a cross sectional view of the piston 50 (without dynamic seal 86b and the second check valve 84). FIG. 5B is an enlarged detail view of detail B in FIG. 5A showing the interface between piston rod body 90 and piston head 92. FIGS. 5A and 5B will be discussed together. Piston 50 includes piston rod 52 and sleeve 54. Piston rod 52 includes piston cap 88, piston rod body 90, and piston head 92. Sleeve 54 includes sleeve body 94, first end 96, and second end 98. Piston cap 88 includes cap shoulder 102 and connecting portion 104. Piston rod body 90 includes upstream end 106, downstream end 108, seal groove 110, shank 112, cylindrical relief 142, second centering control section 150, third centering control section 152, non-controlled portions 158, and recess 166. Piston head 92 includes socket 100, central bore 114, flange 116, head shoulder 118, relief 119, piston ports 146, grooves 147, first centering control section 154, and projecting ring 156.

As shown, shank 112 extends from piston rod body 90 into socket 110 of piston head 92. Dash lines are used to indicate a threaded section 162 where external threading of shank 112 interfaces with internal threading of socket 100 to couple the piston rod body 90 to the piston head 92. A portion of the internal threading of the socket 100 can be formed on the inner surface of ring 156.

As shown in FIG. 5B, vector R projects radially, orthogonal to longitudinal axis L-L, and extends through shank 112. The shank 112, the projecting ring 156, and the sleeve 50 radially overlap with respect to longitudinal axis L-L. The sleeve 50 radially overlaps at least a portion of the threaded portion 162 connecting the piston rod body 90 and the piston head 92. Specifically, the shank 112 is at the core with the ring 156 radially outward from the shank 112 and the sleeve 54 radially outward about the ring 156 and the shank 112.

The piston rod body 90 includes recess 166. The recess 166 has a smaller diameter than the centering control sections 150, 152 of the piston rod body 90 and the non-control portions 158 of the piston rod body 90. The recess 166 having a smaller diameter facilitates ring 156 fitting over downstream end 108 of piston rod body 90.

First centering control section 154 is formed on ring 156 and interfaces with sleeve 54 such that sleeve 54 is aligned with piston head 92 and on axis L-L. Additional centering control sections 150, 152 interface with sleeve 54 to align sleeve on piston rod body 90. As such, centering control sections on piston head 92 (e.g., first centering control section 154) and on piston rod body 90 (e.g., second and third centering control sections 150, 152) concentrically align sleeve 54 within recess 142.

Without ring 156, sleeve 54 would be mounted only on piston rod body 90 and would align with piston rod body 90, which may be slightly offset from piston head 92 due to the difficulty in aligning the threading between piston head 92 and piston rod body 90. By having sleeve 54 rest on cylindrical centering control surfaces of each of the piston head 92 (e.g., first centering control section 154) and the piston rod body 90 (e.g., second and third centering control sections 150, 152), sleeve 54 bridges between the cylindrical surfaces to limit misalignment of piston head 92 and piston rod body 90. Proper concentricity of sleeve 54 with respect to this reciprocation axis of piston 50 along longitudinal axis L-L is particularly important due to the tight fit and tolerances between the exterior of the sleeve 54 and sealing surfaces (e.g., the first dynamic seal 86a).

While the illustrated embodiment shows shank 112 extending from upstream end 106 of piston rod body 90 and being received by socket 100 of piston head 92, different configurations are possible, while still using a centering control sections 150, 152, 154 to support both ends of sleeve 54. For example, shank 112 can be formed as part of piston head 92 and can extend downstream from centering control section 154 to be received within socket 100 formed in upstream end 106 of piston rod body 90.

Figure 6:
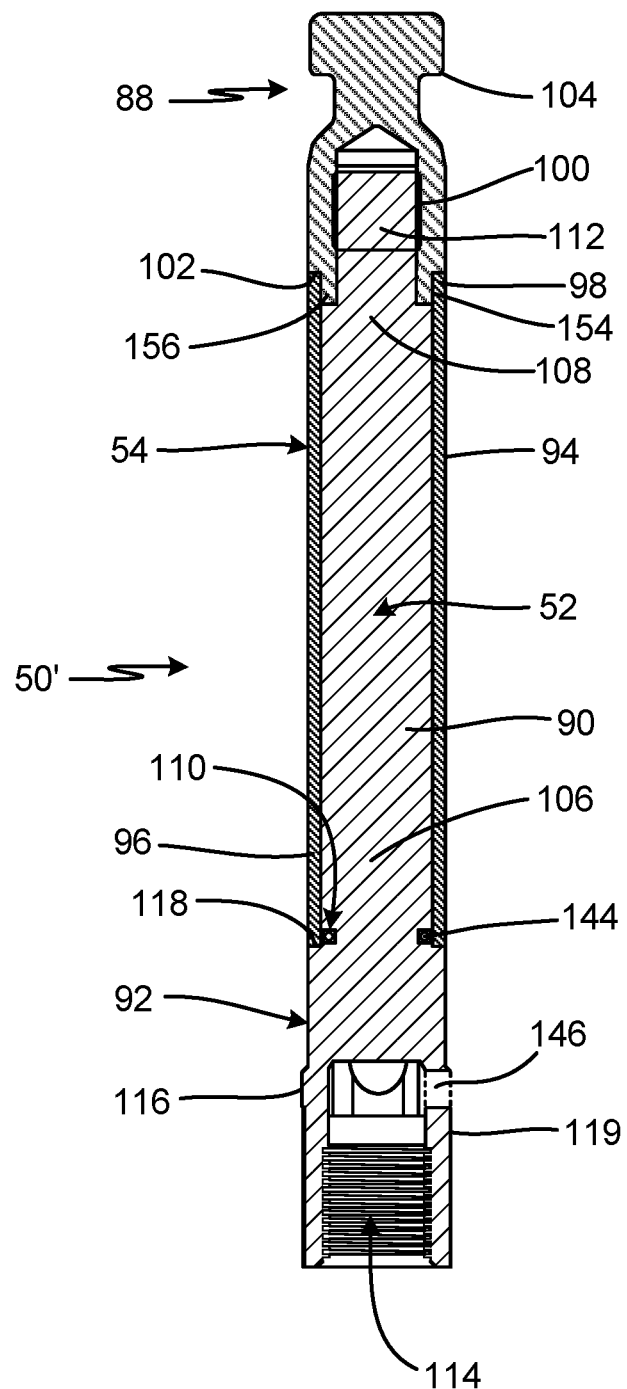
FIG. 6 is a cross-sectional view of a piston.

In another embodiment, piston rod body 90 can be part of piston head 92 (e.g., piston rod body 90 and piston head 92 are permanently fixed together and may be formed from a single piece of metal) while piston cap 88 is removable from piston rod body 90, as shown in FIG. 6. In which case, shank 112 can extend from the upstream end of piston cap 88 to be received in socket 100 formed in downstream end 108 of piston rod body 90. In this case, the first centering control section 154 would be on piston cap 88, adjacent to, and between cap shoulder 102 and shank 112. First centering control section 154 being formed as part of the piston cap 88 also facilitates alignment and concentricity of sleeve 54 on piston 50 during assembly and operation. In another embodiment in which piston cap 88 is removable from piston rod body 90, the shank 112 can extend in the downstream direction from downstream end 108 of piston rod body 90 and can be received by a socket 100 formed in the upstream end of piston cap 88. In this embodiment, the ring 156 with the first centering control section 154 can extend from cap shoulder 102 and can be the upstream-most part of piston cap 88.

In another embodiment involving two shanks 112, the shanks can extend from both the upstream and downstream ends 106, 108 of piston rod body 90 to be received in respective sockets 100 formed in piston cap 88 and piston head 92. Piston head 92 can include a first ring, similar to ring 156, having a centering control section, similar to centering control section 154, as shown, while piston cap 88 can include a second, similar ring having a second centering control section, the ring extending in the upstream direction from cap shoulder 102 and which can be the upstream-most part of piston cap 88. Alternatively, a first shank 112 may extend from the downstream end of centering control section 154 of piston head 92 to be received within a socket 100 within upstream end 106 of piston rod body 90 while another shank may extend from the upstream end of piston cap 88 to be received within a socket 100 in downstream end 108 of piston rod body 90. In such case, centering control sections may be located adjacent to, and between, the cap shoulder 102 and the respective shank extending from cap shoulder 102 and adjacent to, and between, head shoulder 118 and the respective shank extending from head shoulder 118.

The piston head 92 and piston cap 88 can be referred to herein as a piston end, such piston end connecting with piston rod body 90. The piston head 92 can also be referred to as an upstream piston end. The piston end can have a centering control section similar to centering control section 154. A piston cap 88 detachable from and re-attachable to a piston rod body 90 can be referred to as a piston end. Such piston end can also be referred to as a downstream piston end. As described above, the piston end, whether being an attachable and re-attachable piston head or an attachable and re-attachable piston, can include a centering control section. The piston end can also include a shank or a socket for connecting with the piston rod body. Unless otherwise noted, the centering control section of the piston end may be similar to the first centering section 154 of the ring 156, such as by extending from a shoulder, or may be similar to any centering control section referenced herein, however not all versions may be so limited.

FIG. 6 is a cross-sectional view of piston 50'. As shown in FIG. 6, shank 112 extends from downstream end 108 of piston rod body 90 and socket 100 is formed in piston cap 88. As such, piston cap 88 is removable from piston rod 52 to facilitate mounting and dismounting of sleeve 54 from piston rod 52. Ring 156 extends in the upstream direction from cap shoulder 102. Centering control section 154 is formed on the exterior surface of ring 156. Shank 112, ring 156, and sleeve 54 radially overlap, as shown by arrow R in FIG. 6, with piston 50 assembled.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A piston head of a piston of a paint sprayer, the piston having a sleeve and a shank, the piston head comprising:
   a socket for receiving the shank, the socket extending into a first end of the piston head; and
   a ring projecting from the first end of the piston head and defining at least a portion of the socket, the ring having a cylindrical ring exterior, wherein the shank fits within the socket and the sleeve rests on the cylindrical ring exterior such that the shank, the ring, and the sleeve radially overlap each other;
   a central bore extending into a second end of the piston head such that a portion of the piston head fluidly separates the socket and the central bore;
   a piston port extending through a body of the piston head and fluidly connected to the central bore.

2. The piston head of claim 1, wherein the shank and the socket are complementarily threaded to attach to each other.

3. The piston head of claim 1, wherein the piston head includes a shoulder projecting radially outward from the cylindrical ring exterior.

4. The piston head of claim 3, wherein an end of the sleeve engages the shoulder while the sleeve is disposed over the cylindrical ring exterior.

5. The piston head of claim 1, wherein the cylindrical ring exterior forms a first centering control section that axially aligns the sleeve relative to the piston end.

6. A piston rod comprising:
   a piston rod body;
   the piston head of claim 1 disposed at an upstream end of the piston rod body;
   a piston cap disposed at a downstream end of the piston rod body;
   wherein the sleeve is retained on the piston rod body by engagement between a first end of the sleeve and a piston head shoulder formed on the piston head, and by engagement between a second end of the sleeve and a piston cap shoulder of the piston cap.

7. A piston of a paint sprayer configured to reciprocate on a piston axis, the piston comprising:
   a piston rod body having a first cylindrical exterior surface;
   a piston cap disposed at a first end of the piston rod body;
   a piston head disposed at a second end of the piston rod body, wherein a flowpath is formed through an interior of the piston head to a piston port extending through the piston head such that fluid can exit from the interior of the piston head through the piston port;
   a piston end formed by one of the piston cap and the piston head, the piston end having a second cylindrical exterior surface, the piston end detachable from and re-attachable to the piston rod body; and
   a sleeve mountable on the piston rod body, the sleeve having an inner cylindrical surface;
   wherein the inner cylindrical surface rests on and overlaps each of the first cylindrical exterior surface and the second cylindrical exterior surface when the sleeve is mounted on the piston rod body and the piston end is attached to the piston rod body.

8. The piston of claim 7, wherein a first one of the piston rod body and the piston end has a shank and a second one of the piston rod body and the piston end has a socket configured to receive the shank to attach the piston rod body to the piston end.

9. The piston of claim 7, wherein the piston end includes a shoulder adjacent to and extending radially relative to the second cylindrical exterior surface, and wherein an end of the sleeve engages the shoulder while the sleeve rests on the second cylindrical exterior surface.

10. The piston of claim 7, wherein the second cylindrical exterior surface includes a first centering control section configured to engage the inner cylindrical surface and align the sleeve relative to the piston axis.

11. The piston of claim 10, wherein the first cylindrical exterior surface includes a second centering control section configured to engage the inner cylindrical surface and align the sleeve relative to the piston axis.

12. The piston of claim 11, wherein the piston rod body comprises at least one non-centering section disposed along the first cylindrical exterior surface, wherein the piston rod body has a first diameter at the second centering control section and the piston rod body has a second diameter at the at least one non-centering section, and wherein the first diameter is larger than the second diameter such that the inner cylindrical surface of the sleeve does not contact the at least one non-centering section when the piston rod body is within the sleeve due to the sleeve resting on the second centering control section.

13. The piston of claim 12, wherein a shank extends from the piston rod body and a socket is formed in the piston end, wherein the socket is configured to receive the shank to attach the piston rod body to the piston end, wherein the piston rod body includes a recess formed proximate the shank, wherein the piston rod body has a third diameter at the recess, and wherein the third diameter is smaller than the second diameter.

14. The piston of claim 7, wherein the second cylindrical exterior surface is formed on a ring that extends from the piston end.

15. The piston of claim 14, wherein the ring defines a socket that receives a shank extending from the piston rod body to connect the piston rod body to the piston end.

16. The piston of claim 15, wherein the shank, the ring, and the sleeve radially overlap one another.

17. A method of assembling a piston having a piston rod body, a piston cap disposed at a first end of the piston rod body, and a piston head disposed at a second end of the piston rod body, the method comprising:
  sliding a sleeve onto a first portion of a piston such that an inner circumferential surface of the sleeve contacts and slides over a first centering control portion formed on the first portion of the piston rod; and
  inserting a shank formed on one of the first portion of the piston and a second portion of the piston into a socket formed on the other of the first portion of the piston and the second portion of the piston to secure the first portion of the piston to the second portion of the piston, wherein the inner circumferential surface of the sleeve slides over and contacts a second centering control portion formed on the second portion of the piston;
  wherein the first centering control portion and the second centering control portion support the sleeve on the piston and align the sleeve on a longitudinal axis of the piston; and
  disposing a check valve within the piston head;
  wherein the first portion of the piston is formed by the piston rod body and the second portion of the piston is formed by one of the piston cap and the piston head; and
  wherein a piston port extends through the piston head such that fluid can exit from an interior of the piston head through the piston port.

18. The method of claim 17, wherein securing the first portion of the piston rod to the second portion of the piston rod includes engaging interfaced threading formed on the first portion of the piston rod and the second portion of the piston rod.

19. A displacement pump for a fluid sprayer, the displacement pump comprising:
  a pump cylinder; and
  a piston configured to reciprocate along a pump axis and relative to the pump cylinder to pump fluid, the piston comprising:
    a piston rod body at least partially disposed within the pump cylinder and having a first cylindrical exterior surface;
    a piston cap disposed at a first end of the piston rod body;
    a piston head disposed at a second end of the piston rod body and within the pump cylinder;
    a piston end formed by one of the piston cap and the piston head, the piston end having a second cylindrical exterior surface, the piston end detachable from and re-attachable to the piston rod body; and
    a sleeve mountable on the piston rod body, the sleeve having an inner cylindrical surface;
  wherein the inner cylindrical surface rests on and overlaps each of the first cylindrical exterior surface and the second cylindrical exterior surface when the sleeve is mounted on the piston rod body and the piston end is attached to the piston rod body; and
  wherein a dynamic seal is disposed radially between the piston head and the pump cylinder to divide the pump cylinder into an upstream chamber and a downstream chamber.

* * * * *